United States Patent [19]

Gocho

[11] 4,394,593
[45] Jul. 19, 1983

[54] LIQUID COOLED DYNAMOELECTRIC MACHINES

[75] Inventor: Yoshitsugu Gocho, Fujisawa, Japan

[73] Assignee: Tokyo Shibaura Denki Kabushiki Kaisha, Kanagawa, Japan

[21] Appl. No.: 287,909

[22] Filed: Jul. 29, 1981

[30] Foreign Application Priority Data

Aug. 14, 1980 [JP] Japan .................. 55-111023

[51] Int. Cl.³ .............................................. H02K 9/00
[52] U.S. Cl. .................................... 310/54; 310/61; 310/64; 277/59
[58] Field of Search ...................... 310/52, 54, 57, 58, 310/59, 61, 64, 65, 60 R, 91, 90, 261; 277/53, 59; 62/505

[56] References Cited

U.S. PATENT DOCUMENTS

| | | | |
|---|---|---|---|
| 3,571,634 | 11/1969 | Sato et al. | 310/61 |
| 3,626,717 | 12/1971 | Lorch | 310/61 |
| 3,733,501 | 5/1973 | Heller et al. | 310/54 |
| 3,740,595 | 6/1973 | Heller et al. | 310/64 |
| 3,740,596 | 6/1973 | Curtis et al. | 310/54 |
| 3,831,046 | 8/1974 | Curtis | 310/54 |
| 3,868,520 | 2/1975 | Curtis et al. | 310/61 |
| 3,991,587 | 11/1976 | Laskaris | 310/61 |
| 4,018,059 | 4/1977 | Hatch | 310/54 |
| 4,114,059 | 9/1978 | Albaric et al. | 310/54 |
| 4,155,019 | 5/1979 | Weghaupt | 310/61 |
| 4,289,986 | 9/1981 | Kullmann | 310/61 |

FOREIGN PATENT DOCUMENTS

| | | | |
|---|---|---|---|
| 46-47881 | 10/1971 | Japan | 310/61 |
| 50-102805 | 2/1975 | Japan | 310/61 |
| 53-32308 | 3/1978 | Japan | 310/58 |
| 401460 | 11/1933 | United Kingdom | 277/59 |

Primary Examiner—R. Skudy
Attorney, Agent, or Firm—Stevens, Davis, Miller & Mosher

[57] ABSTRACT

In liquid cooled dynamoelectric machine having a hollow rotor shaft, and cooling water supplying and exhausting tube assembly of a concentric construction extended in the rotor shaft, there are provided a stationary frame provided around a portion of the tube assembly extending outwardly from one end of the rotor shaft, the stationary frame defining therein a liquid-tight chamber communicated with a cooling water exhaust portion of the tube assembly, pipes for supplying and exhausting cooling water provided through the stationary frame, and sealing means for sealing gaps between the stationary frame and the tube assembly.

3 Claims, 1 Drawing Figure

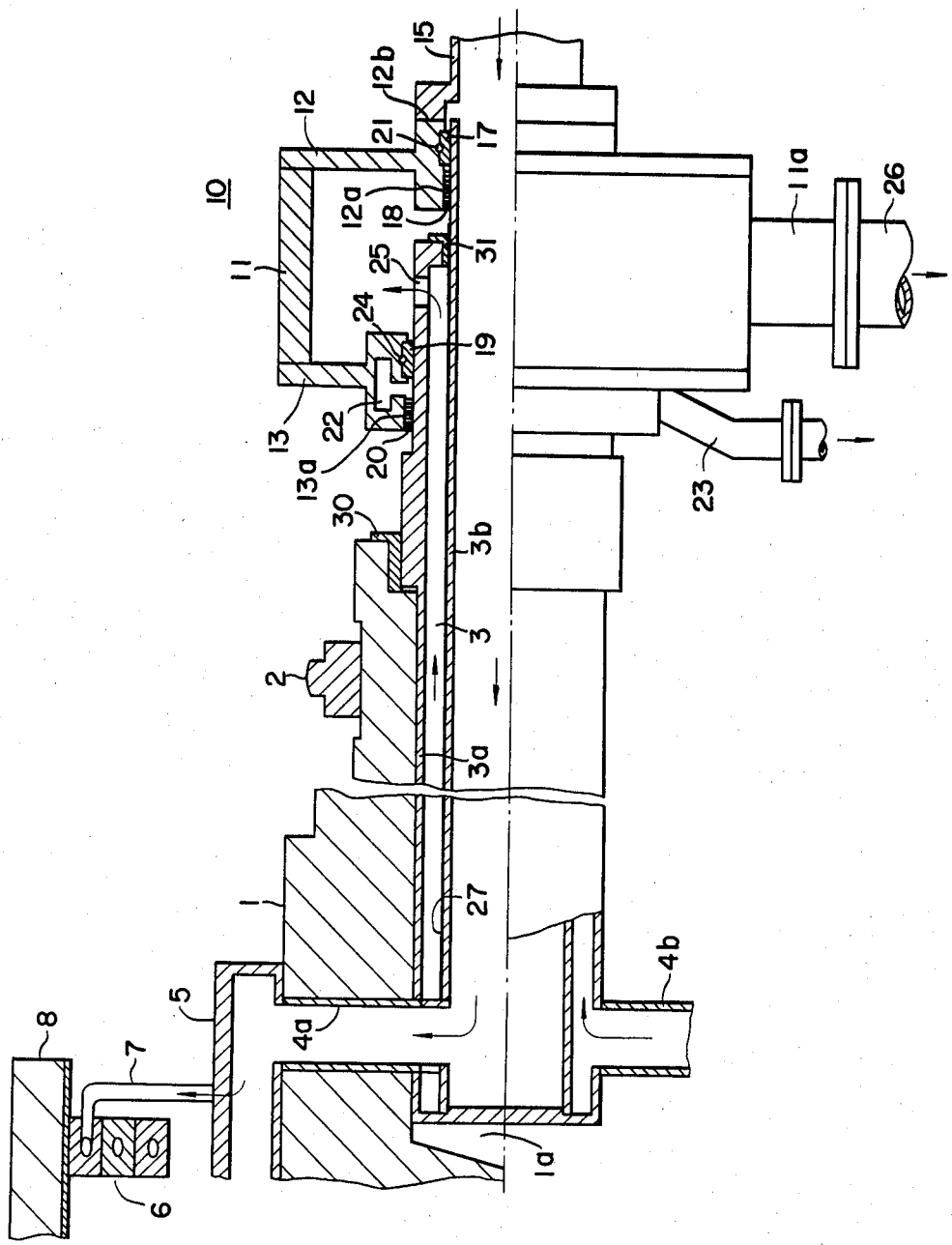

LIQUID COOLED DYNAMOELECTRIC MACHINES

BACKGROUND OF THE INVENTION

This invention relates to liquid cooled dynamoelectric machines, such as turbogenerators, the unit capacity of which is extremely large, and more particularly to a construction of rotors of such electric machines which is adapted to circulate liquid coolant.

Heretofore, a dynamoelectric machine of a large capacity has been ordinarily cooled with a gaseous medium, such as hydrogen gas. In such cases, the gaseous medium is forcibly circulated by a fan secured to the rotor through ducts and windings of the stator and rotor for passing through a heat exchanger which is provided within the stator for transmitting the heat of the gaseous medium to outside air.

However, as a result of the constant increase in recent years of the unit capacity of the electric machine, there is a tendency of changing the cooling medium from the gaseous coolant to liquid coolant such as water or oil, the cooling capability of which is much higher than that of the gaseous coolant. Since water is used in most cases, a term "cooling water" is hereinafter used instead of the liquid coolant.

In cases where a liquid coolant (or cooling water) is used in the electric machine of a large capacity, each conductor for the stator windings and rotor windings is formed into a hollow construction having an internal bore through which cooling water is circulated.

Although it is comparatively easy to supply and circulate cooling water through the stator windings of the above described construction, difficulties arise in supplying and exhausting cooling water into and out of the rotor which is rotated at a high speed. It is preferred that cooling water is supplied into and exhausted out of the rotor at positions nearby the rotating axis of the rotor in order to avoid adverse effect of the centrifugal force.

Conventionally, a cooling water supplying and exhausting device has been provided on one longitudinal side of the rotor. The device comprises a cooling water supply tube and a cooling water exhaust tube both extending through a bore of the rotor shaft. Cooling water supplied through the cooling water supply tube is then passed through radial conduits or radial passages into a cooling water distributing chamber provided on the surface of the rotor, and then is distributed throughout the internal bore of the hollow conductors constituting the rotor windings (or field windings). Cooling water circulated through the rotor windings is collected in a chamber similar to the distributing chamber, and returned through radial conduits or radial passages to the cooling water exhaust tube. All of the above described tubes, conduits, and chambers, except the winding conductors, or at least the internal surfaces of these members are made of, or lined with a corrosion resistant material such as stainless steel of austenite structure.

Ordinarily, the cooling water supply tube and the cooling water exhaust tube are arranged concentrically with the supply tube disposed at the center. More specifically, the two tubes are combined into a double wall construction, a space within the internal wall serving as the cooling water supply tube, while a space between the two walls serving as the cooling water exhaust tube.

In the above described conventional arrangement, since the cooling water exhausted from the field windings and therefore having a high temperature is exhausted through the cooling water exhaust tube formed between the two walls, temperature differences are created between the outer wall and the inner wall, and also between the outer wall and the rotating shaft, thus resulting in uneven thermal expansions of these members. The difference in thermal expansions between the outer wall and the rotor shaft is particularly great because of a difference of more than 50% existing between the linear thermal expansion coefficients of these members.

In a conventional construction where the two tube walls are secured to the rotor shaft at the distal and proximal ends of the same walls, excessive stresses tend to be created particularly at the junction points between these tube walls and the radial conduits and also internally of these walls. Each time the electric machine starts and stops, these stresses appear and disappear repeatedly. Should cracks are formed in these parts, serious troubles such as breakage of the rotor shaft and leakage of water tend to occur.

For obviating such difficulties, a construction including flexible bellows at each junction point between the radial conduit and the cooling water supply tube or exhaust tube has been disclosed in U.S. Pat. No. 3,740,595. An alternative construction wherein members tending to be subjected to severe stresses are prestressed in a direction opposite to expected stresses has been disclosed in Japanese Laid-Open Patent Specification No. 102805/1975.

However, the former construction is found to be disadvantageous because of a comparatively short operational life of the bellows, while the latter construction has a difficulty in predicting intensities of such stresses.

Japanese Patent Publication No. 47881/1978 discloses an arrangement wherein mechanical seals and fluid seals are provided for preventing cooling water from leaking out of gaps between the shaft and structural members. However, such a construction is not satisfactory because the sealing members must be replaced occasionally, and the size of the cooling water supplying and exhausting device is thereby increased.

SUMMARY OF THE INVENTION

A primary object of the present invention is to provide a liquid cooled dynamoelectric machine wherein all of the above described difficulties of the conventional constructions are substantially overcome.

Another object of the invention is to provide a liquid cooled dynamoelectric machine wherein the construction of the cooling water supplying and exhausting device is much simplified by the use of a seal ring and a labyrinth, and the size of the device is thereby much reduced.

Still another object of the invention is to provide a liquid cooled dynamoelectric machine wherein distal ends of the cooling water supply and exhaust tubes which are combined into a double wall construction, are secured by use of bushings of high rigidity in such a manner that the same ends are slidable between each other and also against the rotor shaft.

These and other objects of the present invention can be achieved by providing a liquid cooled dynamoelectric machine of the type having a hollow rotor shaft and a cooling water supply tube and a cooling water exhaust tube which are combined into a concentrically arranged tube assembly extended in the hollow rotor shaft in such a manner that an outer tube of the assembly extends outwardly beyond a distal end of the rotor shaft, and an inner tube of the assembly further extends outwardly beyond a distal end of the outer tube, wherein said machine further comprises a stationary frame provided around a portion of the tube assembly extending out of the rotor shaft, the stationary frame defining therein a liquid-tight chamber communicated through a number of holes provided through the outer tube with a space formed between the outer tube and the inner tube, means for supplying cooling water into the inner tube, means for exhausting cooling water from the liquid-tight chamber, and means for sealing gaps between the stationary frame and the tube assembly rotating together with the rotor shaft.

Preferably, rigid bushings are inserted between the distal end of the rotor shaft and the outer tube of the tube assembly, and also between the distal end of the outer tube and the inner tube for ensuring the alignment of the outer tube and the inner tube with the rotating axis of the rotor shaft.

The above mentioned means for supplying cooling water comprises a coupling portion provided integrally with an axially outside wall of the stationary frame near the distal end of the inner tube for introducing cooling water therethrough into the inner tube.

The invention will be described in detail with reference to a single accompanying drawing.

BRIEF DESCRIPTION OF THE DRAWING

The single FIGURE of the accompanying drawing is an elevational view, partly in section, showing essential portions of a liquid cool dynamoelectric machine constituting a preferred embodiment of the present invention.

DESCRIPTION OF PREFERRED EMBODIMENT

Referring to the single FIGURE, there are illustrated essential portions of a liquid cooled dynamoelectric machine, and more particularly a portion of a rotor shaft 1 of the machine, which extends in one direction from the main portion of a rotor (not shown).

A main bearing for supporting the rotor shaft, slip rings for supplying electric power to rotor windings, and parts related thereto are omitted for clarifying the drawing. Further an auxiliary bearing 2 is provided to support the shaft 1 for eliminating any deflection thereof away from its longitudinal axis.

The rotor shaft 1 is made hollow having an internal bore 1a. A tube assembly 3 of a double wall construction is provided in the internal bore 1a of the rotor shaft 1. The tube assembly 3 comprises an outer tube 3a and an inner tube 3b both arranged in a concentrical relation. The internal space of the inner tube 3b serves to supply cooling water to rotor windings (or field windings) 6 provided for the rotor main body, while an annular space between the outer tube 3a and the inner tube 3b serves to exhaust cooling water out of the rotor windings 6 of the hollow construction as described hereinbefore.

Radial conduits (or passages) 4a and 4b extend from the proximal end of the tube assembly 3 radially outwardly. More specifically, the conduits 4a are communicated with the interior of the inner tube 3b, thereby forming cooling water supply passages, while the conduits 4b are communicated with the annular space between the two tubes 3a and 3b, thereby forming a cooling water exhaust passage.

The radial conduits 4a and 4b are, at their outer ends, connected with a distribution manifold 5 and a collecting manifold (not shown), respectively, both provided radially outwardly of the rotor shaft 1. The manifolds are connected with the conductors of the field windings 6 through a number of electrically insulating tubes 7. A retaining ring 8 supports the rotor windings 6 against centrifugal force caused by the rotation of the rotor.

The tube assembly 3 projects axially outwardly (away from the main portion of the rotor) from the distal end of the rotor shaft 1 in a telescopic manner. More specifically, the outer tube 3a projects from the distal end of the rotor shaft 1 for a predetermined length, while the inner tube 3b projects from the distal end of the outer tube 3a for another predetermined length. At the distal end of the outer tube 3a, the thickness thereof is increased so that the annular space between the two tubes 3a and 3b serving as the cooling water exhaust tube terminates at this position. A number of perforations 25 are provided through the outer tube 3a near the distal end thereof.

A stationary annular frame 10 is provided around the tube assembly 3 so as to cover the end portion of the outer tube 3a formed with the perforations 25. The frame 10 has a circumferential wall 11 and two side walls 12 and 13 on both sides of the wall 11 for defining an exhaust water chamber within these walls. The side wall 12 has a central hole 12a through which the inner tube 3b extends axially outwardly, and a coupling portion 12b formed around the central hole 12a to provide an annular surface adapted to be coupled with an outer cooling water supply line having a cooling water supply pump (not shown). The inner tube 3b extending in the central hole 12a of the side wall 12 terminates at a position substantially aligning with the annular surface of the coupling portion 12b, so that the cooling water supplied through the supply line 15 is directly introduced into the inner tube 3b.

On the other hand, the side wall 13 has a central hole 13a through which the outer tube 3a extends into the annular frame 10 so that the perforations 25 formed at the distal end thereof are located suitably in the exhaust water chamber formed within the frame 10.

The circumferential wall 11 of the frame 10 is coupled with an outer pipe line 26 leading to a water reservoir (not shown) through a pipe 11a. Cooling water exhausted through the space between the two tubes 3a and 3b and the perforations 25 into the exhaust water chamber formed in the annular frame 10 is thus delivered through the pipe 11a and the outer pipe line 26 into the water reservoir (not shown).

In order that the cooling water supplied from the cooling water supply line 15 into the inner tube 3b of the tube assembly 3 be prevented from leaking into the exhaust water chamber in the frame 10, a seal ring 17 and a labyrinth 18 are provided between the internal surface of the hole 12a and the outer surface of the inner tube 3b. Likewise another seal ring 19 and another labyrinth 20 are provided between the internal surface of the hole 13a and the outer surface of the outer tube 3a. Furthermore, a drain chamber 22 is provided in the hole 13a between the seal ring 19 and the labyrinth 20, and a drain pipe 23 is coupled to the drain chamber 22 for exhausting a small amount of cooling water leaked into the drain chamber 22.

It should be noted that a small amount of radial play or allowance is provided between the radially outward surface of the seal ring 17 (or 19) and the internal surface of the hole 12a (or 13a) and also between the tips of the labyrinth 18 (or 20) and the mating surface, and an O-ring 21 (or 24) is inserted between the seal ring 17 (or 19) and the internal surface of the hole 12a (or 13a) to permit radial displacement of the rotor shaft 1 due to the presence and absence of oil film in the bearing without damaging the sealing arrangement.

A bushing 30 made of a rigid material is inserted at the distal end of the rotor shaft 1 between the internal surface of the inner bore 1a and the outer surface of the outer tube wall 3a of the tube assembly 3 for supporting the tube assembly 3 against a bending force. In a case where a gas-tight construction of the entire electric machine is required, packing grooves might be provided in this part for preventing gas from leaking out through this part.

Likewise, another bushing 31 made of the same rigid material as the bushing 30 is inserted between the distal end of the outer tube wall 3a and the outer surface of the inner tube 3b for supporting the inner tube 3b against bending. This part does not require any gas-sealing arrangement as described in relation with the distal end of the rotor shaft.

The outer surface of the inner tube 3b is preferably covered, along its entire length, by a layer of a low heat conductivity material (such as Teflon coating) 27 for preventing heat conduction from the cooling water exhausted through the space between the outer tube 3a and the inner tube 3b to the cooling water newly supplied into the inner tube 3b, and also for facilitating the insertion of the bushing 31. A heat-shrinkable tube of a low heat conductivity may also be used for the same purpose.

Whereas the invention is advantageously applied to the rotor construction of tubo-generators and the like synchronous machines of large sizes, it should be noted that the stators of these machines may be cooled in any arbitrary manner. That is, the stator may be cooled by a liquid coolant or by hydrogen gas or the like.

Although the tube assembly 3 has been described to be a concentric construction which is located centrally of the internal bore of the hollow rotor shaft 1, it is apparent that such an arrangement may not necessarily be followed strictly, and any arrangement with an inner tube contained in an outer tube may also be utilized within the scope of the invention so far as the coupling portion 12b and therefore the delivering end of the cooling water supply line is brought into substantial alignment with the distal end of the inner tube.

I claim:

1. An apparatus for assisting in the liquid cooling of a dynamoelectric machine comprising a hollow rotor shaft; a double wall tube assembly defining an annular space, said tube assembly secured in said hollow rotor shaft in such a manner that an outer tube of said assembly extends outwardly beyond a distal end of the rotor shaft, and an inner tube of said assembly extends outwardly beyond a distal end of said outer tube; a stationary frame surrounding a portion of said tube assembly extending out of the rotor shaft, said stationary frame defining therein an exhaust chamber communicating with said annular space between said outer tube and said inner tube; means for supplying cooling water into said inner tube; means for exhausting cooling water from said chamber; means for sealing gaps between said stationary frame and said tube assembly; a first bushing between said distal end of the rotor shaft and said outer tube so that the outer tube is axially slidable relative to said first bushing; a second bushing between said distal end of the outer tube and said inner tube such that the inner tube is axially slidable relative to said second bushing, each of the first and second bushings being made of a rigid material; and a layer of a low heat conductivity material covering the outer surface of said inner tube.

2. An apparatus for assisting the liquid cooling of a dynamoelectric machine as set forth in claim 1, wherein: said sealing means comprises an inward sealing portion provided between an inside wall of said stationary frame and said outer tube, and an outward sealing portion provided between an outside wall of said stationary frame and said inner tube, each of said sealing portions comprising a sealing ring and a labyrinth; and a drain pipe provided between said sealing ring and said labyrinth provided in said inward sealing portion.

3. An apparatus for assisting the liquid cooling of a dynamoelectric machine as set forth in claim 1, wherein: said layer of low heat conductivity material extends outwardly to a position underlying said second bushing.

* * * * *